United States Patent [19]

Horiuchi

[11] Patent Number: 5,115,725
[45] Date of Patent: May 26, 1992

[54] PISTON AND CONNECTING ROD ASSEMBLY

[75] Inventor: Shigeaki Horiuchi, Fujisawa, Japan

[73] Assignee: Isuzu Motors, Ltd., Tokyo, Japan

[21] Appl. No.: 675,771

[22] Filed: Mar. 27, 1991

[30] Foreign Application Priority Data

Mar. 30, 1990 [JP] Japan ................... 2-085663
Aug. 29, 1990 [JP] Japan ................... 2-226978

[51] Int. Cl.$^5$ ............................................. F01B 31/10
[52] U.S. Cl. .................................... 92/157; 92/158;
92/187; 403/125
[58] Field of Search ............... 92/187, 158, 159;
403/124, 125, 127; 74/579 E

[56] References Cited

U.S. PATENT DOCUMENTS

| | | | |
|---|---|---|---|
| 1,350,747 | 8/1920 | Stenger | 92/187 |
| 1,413,645 | 4/1922 | Wiltse | 403/125 |
| 2,260,240 | 10/1941 | Taylor | 92/187 |
| 3,173,344 | 3/1965 | Mongitore | 92/187 |
| 4,377,967 | 3/1983 | Pelizzone | 92/158 |
| 4,690,038 | 9/1987 | Klie et al. | 92/187 |

FOREIGN PATENT DOCUMENTS 308905  4/1929  United Kingdom ......... 403/127

Primary Examiner—Edward K. Look
Assistant Examiner—F. Daniel Lopez
Attorney, Agent, or Firm—John E. Toupal; Harold G. Jarcho

[57] ABSTRACT

An arrangement wherein a concave portion on a support end of a connecting rod is slidably engaged with a convex portion formed in a lower part of a piston, and a retainer ring member supported on a skirt portion of the piston is placed in contact with the lower part of the concave rod end.

24 Claims, 7 Drawing Sheets

PISTON AND CONNECTING ROD ASSEMBLY

BACKGROUND OF THE INVENTION

The present invention relates to an internal combustion engine piston and connecting rod assembly which can extend a stroke of a piston in a cylinder body of limited height.

The height of a cylinder body of a conventional internal combustion engine is determined according to a dimension p between a crown surface of a piston and an axis of a piston pin, a length l of a connecting rod connected to the piston and a crank arm of a crank shaft (a distance between an axis of the piston pin and an axis b of a axial portion of the arm of the crank shaft), and a length r of the arm of the crank shaft. Accordingly, an increase in displacement in a conventional or existing multicylinder internal combustion engine can be obtained by either increasing the bore of the cylinder or increasing the stroke 2r of the piston.

According to the first method, the thickness of the wall between the cylinders adjacent to each other is reduced, and there is a limit to the increase of displacement. In the aforementioned second method, the position of the piston pin with respect to the piston is moved upwardly to shorten the dimension p, whereby the arm of the crank shaft is lengthened by that amount. However, in the existing multicylinder internal combustion engine, there is scarcely present allowance in the dimension p between the crown surface of the piston and the piston pin (see Japanese Utility Model Application Laid-open No. 64-47958). When the dimension p is shortened, a combustion chamber becomes so shallow that the shape of the combustion chamber is restricted, making it difficult to obtain a satisfactory combustion condition.

In view of the foregoing, the height h of the cylinder body or the dimension p of the piston is not actually changed but the connecting rod is shortened to lengthen the arm of the crank shaft by that amount. However, when the length l of the connecting rod is shortened and the length r of the arm of the crank shaft is lengthened (that is, l/r is decreased), piston slap becomes noticeable, resulting in abrasion of the piston ring, increase in slap noise and a reduction in fuel efficiency.

However, in order to effectively control the emission of exhaust gases in the future, an increase in displacement of cylinders of the existing engine is required. The problem then is how to increase displacement without changing the height of the cylinder body in an internal combustion engine.

The object of the present invention, therefore, is to provide a piston and connecting rod coupling which can effectively increase a stroke of a piston without changing the height of a cylinder body.

SUMMARY OF THE INVENTION

The invention includes an arrangement wherein a concave portion on a support end of a connecting rod is slidably engaged with a convex portion formed in a lower part of a piston, and a retainer ring member supported on a skirt portion of the piston is placed in contact with the lower part of the concave rod end. Because of this arrangement, the center of oscillation of the connecting rod is moved closer to the crown surface of the piston as compared with a conventional pin coupling construction between a piston and a connecting rod. Thus, the arm of the crank shaft can be lengthened by an amount in which the center of oscillation of the connecting rod comes close to the crown surface of the piston. In addition, the stroke of the piston is extended, while the height of the cylinder body remained unchanged, and the displacement is increased.

According to one feature of the invention, a slide member is inserted between the connecting rod and the piston. The slide member reduces the detrimental effects of transverse piston movement.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
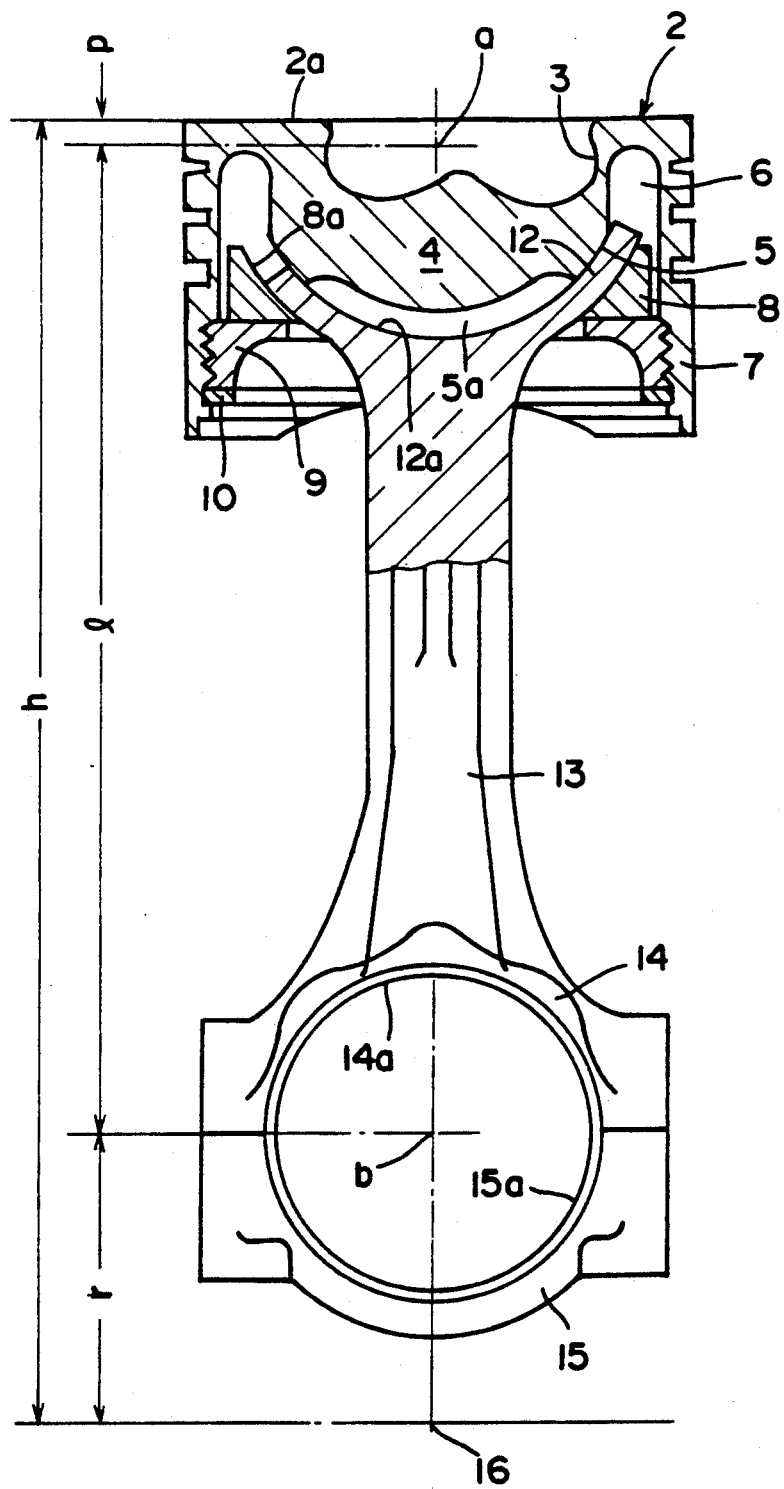
FIG. 1 is a front sectional view of a piston and a connecting rod assembly according to one embodiment of the present invention.
Figure 2:
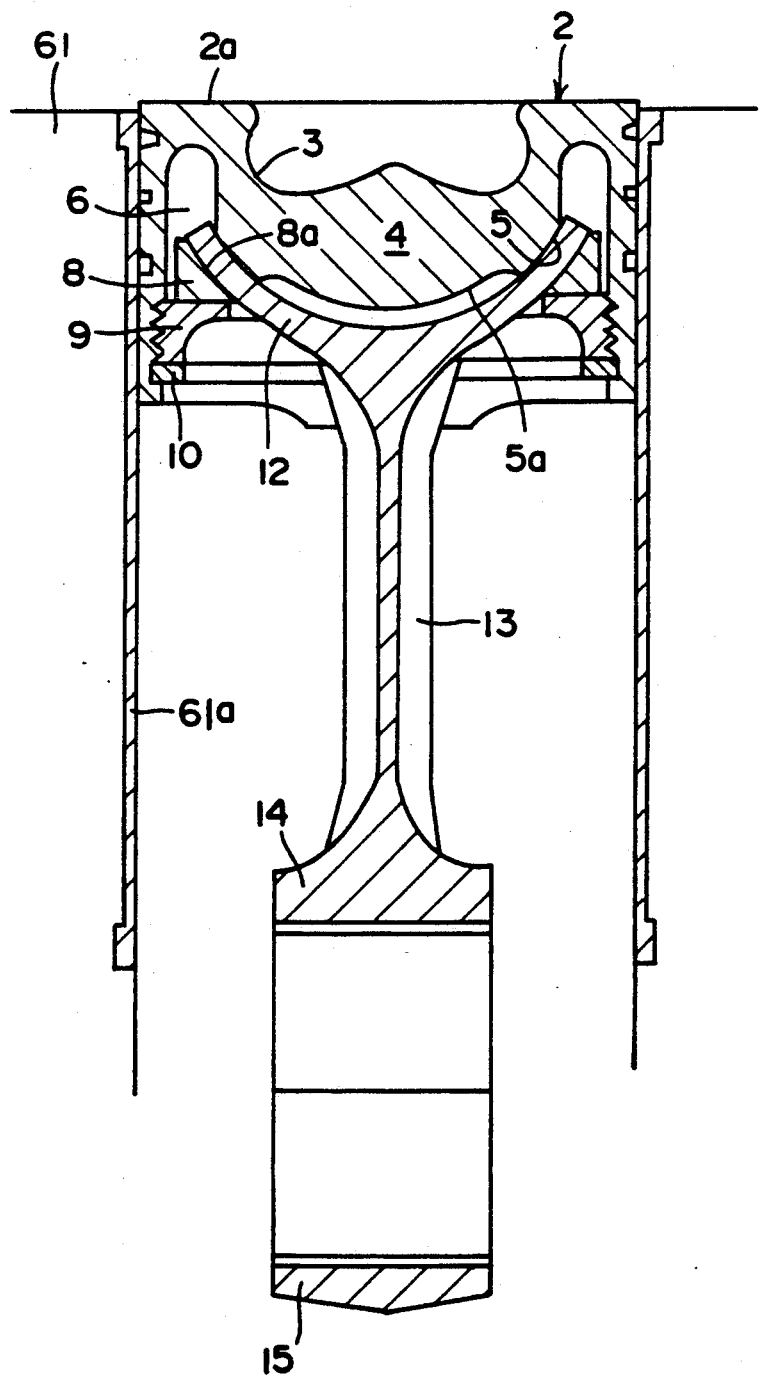
FIG. 2 is a side sectional view of the assembly shown in FIG. 1.

FIG. 1 and FIG. 2 illustrate a piston 2 of, for example, a Diesel engine. The piston has at one end a crown surface 2a with a depression to form a combustion chamber 3. Known piston rings (not shown) are mounted on an outer peripheral wall of a skirt portion 7 which is interiorly hollow. This construction is substantially similar to that of the prior art.

According to the present invention, body portion 4 defines at another end of the piston 2 a convex, spherical piston engagement surface 5 extending downwardly. The circumference of the convex body portion 4 is interrupted by an annular cavity 6, which is filled with lubricating oil for cooling or supplied with lubricating oil from outside. The spherical, convex surface 5 of the body portion 4 is provided with a depression that forms a chamber 5a to receive oil for the purpose of cooling and lubrication. One end 14 of an elongated connecting rod 13 is adapted for connection to a crank shaft (not shown). An opposite cup-shaped end 12 of the rod 13 defines a spherically concave rod engagement surface 12a that is slidably engaged with the convex piston surface 5 along an angular junction. As shown in FIG. 1, the chamber 5a is disposed within and intersects the annular junction between the rod engagement surface 12a and the piston engagement surface 5. Also, the chamber 5a extends transversely to the axis of the rod 13 so as to substantially reduce the width of the annular junction between the rod engagement 12a and the piston engagement surface 5.

An annular retainer ring 8 having a spherically concave retainer surface 8a engages a spherically, convex support surface on the lower portion of the rod end 12 so as to retain an engagement between the convex piston surface 5 and the convex support surface 12a of the rod end 12. The retainer ring 8 is supported by a nut 9 threadedly engaged with the skirt portion 7. Securing the nut 9 is a split ring 10 engaged with the skirt portion 7.

Figure 3:
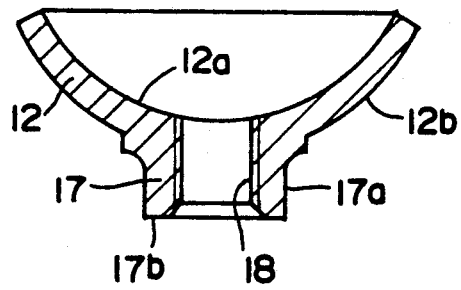
FIG. 3 is a side sectional view of a portion of the connecting rod shown in FIGS. 1 and 2.
Figure 4:
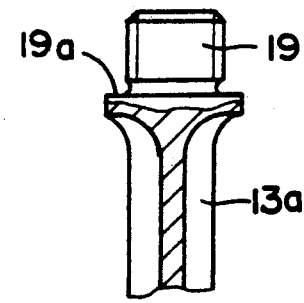
FIG. 4 is a side sectional view of another portion of the connecting rod.

The rod end 12 is formed separately from the middle portion 13 of the connecting rod and they are combined during assembly. As shown in FIGS. 3 and 4, a downwardly extending boss portion 17 is formed integral with the receiving plate rod end 12. The boss portion 17 is formed with a threaded hole 18. Preferably, the boss portion 17 is formed at its outer peripheral surface with a flat surface 17a having a hexagonal shape in section for engagement with a tool. On the other hand, a body 13a of the connecting rod 13 is integrally formed with a threaded shaft 19 extending in a longitudinal direction from an extreme end surface 19a. As the body 13a is constituted separately from the rod end 12, forging of the rod end 12 and machining of the concave surface 12a and the convex surface 12b are facilitated.

The body 13a and the rod end 12 are integrally connected by threadedly engaging the threaded shaft 19 of the body 13a with the threaded hole 18 of the rod end 12 and bringing the extreme end surface 19a of the body 13a into contact with the end surface 17b of the boss portion 17.

As shown in FIGS. 1 and 2, a shaft portion at the extreme end of an arm of a crank shaft 16 (represented by the center of the shaft) is coupled between a semicircular tubular portion 14a of the end 14 of the connecting rod 13 and a semicircular tubular portion 15a of a bearing cap 15. The end 14 of the connecting rod 13 has a configuration similar to that of the prior art.

According to the present invention, the opposite end 12 of the connecting rod 13 supports the convex surface 5 on the lower part of the body portion 14 of the piston 2 and can be oscillated when the crank shaft 16 rotates. As compared with the prior art wherein the extreme end of a connecting rod is connected to a piston by means of a piston pin, the center a of oscillation of the connecting rod 13 by the present invention is displaced substantially from the engaging surfaces 5 and 12a and very close to the crown surface 2a. That is, since the dimension p between the center a of oscillation and the crown surface 2a is reduced, and when the arm (length r) of the crank shaft 16 is lengthened by that reduced amount, the stroke of the piston 2 is increased, and the displacement is considerably increased without changing the height h of the cylinder body 61.

It is to be noted that when a reduced portion of the dimension p between the crown surface 2a and the center a of oscillation is divided into extension of the length 4 of the arm of the crank shaft 16 and the length l of the connecting rod 13, the value of l/r can be maintained as in the prior art, and an inclination (the maximum angle of inclination) of the connecting rod 13 in the state where the crank shaft 16 is rotated ¼ from T.D.C. (top dead center) of the piston 2 can be made as in prior art to suppress piston slap.

While in the above-described embodiment, the spherically convex surface 5 of the piston 2 is supported by the spherically concave surface 12a of the rod end 12, it is to be noted that the present invention is not limited thereto. A convex piston engagement surface having a semicircular shape in section may be supported by a concave rod engagement surface having a semicircular shape in section.

Figure 5:
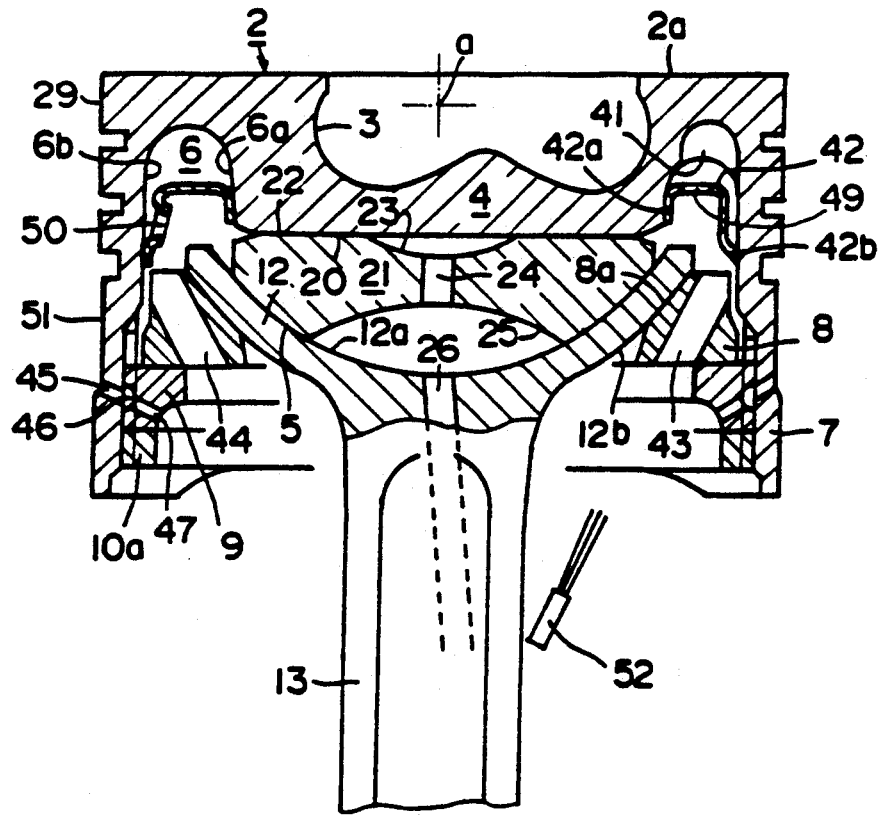
FIG. 5 is a front sectional view of a piston and a connecting rod assembly according to another embodiment of the present invention.
Figure 6:
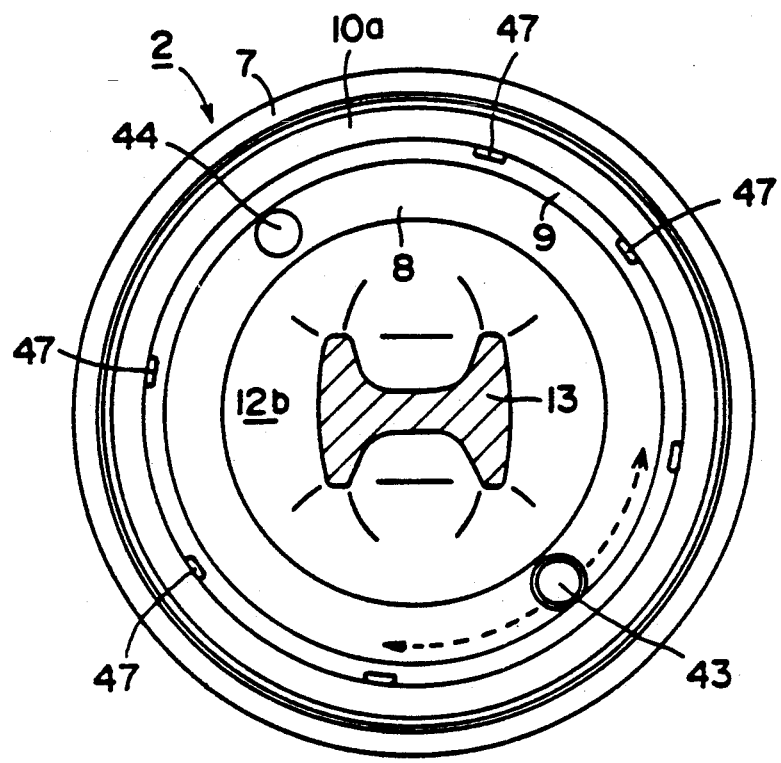
FIG. 6 is a bottom view of the assembly shown in FIG. 5.

In the embodiment shown in FIG. 5, a piston 2 includes the piston member 4 and a slide member 21 formed of a material having excellent wear resistance and heat conductivity. A planar upper slide surface 22 on the slide member 21 slidably engages a planar lower base surface 20 on the piston member 4. The spherically concave rod engagement surface 12a formed at the end 12 of the connecting rod 13 slidably engages a spherically convex surface 5 formed on the lower part of the slide member 21. Provided at the center of the slide member 21 is a passage 24 having an upper end communicating with a depression 23 forming a chamber between the surfaces 20 and 22. A lower end of the passage 24 communicates with a depression 25 in the convex surface 5.

Lubricating oil fed under pressure from an oil pump is supplied to an internal passage 26 in the connecting rod 13 via internal passages in the crank shaft, the crank arm and a crank pin (not shown). That oil is supplied from the internal passage 26 in the connecting rod 13 to the hollow volume formed between the depression 25 and the concave surface 12a. The oil lubricates the slidably engaged slide surface 22 and base surface 20 and the slidably engaged concave rod surface 12a and convex piston surface 5.

A spherically convex support surface 12b formed on the lower portion of the rod end 12 is slidably supported on a spherically concave retainer surface 8a on the upper portion of the annular retainer member 8. Preferably, the retainer member 8 comprises a combination of two segments and is supported slidably on an upper surface of a retaining cylinder 9. The retaining cylinder 9 is threadedly engaged with the skirt portion 7 and is secured in position by a lock nut 10a.

When the connecting rod 13 is inclined about the oscillating center a (the center of curvature of the concave surface 12a) and the piston 2 is pressed down due to an explosion load, the explosion load is divided into a longitudinal component acting on the connecting rod 13 and a lateral component acting on the piston 2. When the piston 2 is pushed up by the connecting rod 13, the associated force is divided into a component urging the piston 2 upward and a component urging the piston in a lateral direction. Therefore, a relative sliding movement occurs between the base surface 20 of the piston member 4 and the slide surface 22 of the slide member 21. In addition, a relative sliding movement occurs between the lower surface of the retainer ring 8 and the upper surface of the retainer tube 9. The shock load on the outer peripheral wall of the piston 2 with respect to the inner peripheral wall of the cylinder 61a resulting from the lateral movement of the piston is relieved by the viscous resistance of oil which lubricates the sliding surfaces.

As shown in FIG. 5, an annular partitioning plate 42 having an inverted U-shape in section is disposed in the annular cavity 6. An inner peripheral portion 42a of the partitioning plate 42 is downwardly curved and resiliently engages a peripheral wall of the body portion 4, that is, an inner wall 6a of the annular cavity 6. An outer peripheral portion 42b of the partitioning plate 42 is resiliently engaged with an outer wall 6b of the annular cavity 6 formed by the skirt 7. The partitioning plate 42 is formed with an inlet hole 49 adjacent to an inlet passage 43 and an outlet hole 50 adjacent to an outlet passage 44.

Figure 7:
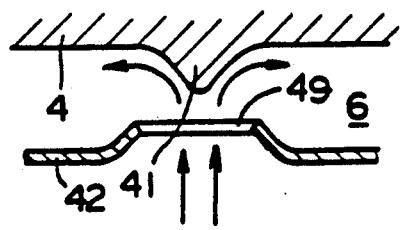
FIG. 7 is a side sectional view of an oil supply system to an annular space in a crown portion of the piston shown in FIG. 5.

The inlet passage 43 and the outlet passage 44 are spaced apart peripherally in the retainer ring 8 in order that lubricating oil supplied under pressure from an oil pump to an oil jet 52 disposed at the lower end of the cylinder is introduced into the annular cavity 6 in the piston 2. A flow dividing wall or branch-flow wall 41 having an inverted triangular shape in section is projected downwardly from an upper portion of the annular cavity 6, at a position opposed to the inlet hole 49, as shown in FIG. 7. Consequently, oil introduced into the annular cavity 6 and branches in directions opposite to each other to flow toward the outlet hole 50.

Oil jetted out of an oil jet 52 disposed at the lower end of the cylinder impinges upon the branch-flow wall 41 of the annular cavity 6 via the inlet passage 43 of the retainer ring 8 and the inlet hole 49 of the partitioning plate 42 and then branches to left and right within the annular cavity 6. That circulating oil cools the crown portion of the piston 2, particularly, the peripheral wall of the combustion chamber 3, and flows from the outlet hole 50 to the annular space between the partitioning plate 42 and the retainer ring member 8. From there, the oil flows down into the crank case or the crank chamber via the outlet passage 44 in the retainer ring 8. Preferably, the partitioning plate 42 has a downward slope from the inlet hole 49 toward the outlet hole 50, (the surface of the partitioning plate 42 is inclined with respect to the crown surface 2a of the piston), to further enhance oil flow and the cooling effect.

As shown in FIG. 5, an annular recess 51 is formed in the outer surface of the skirt 7 below a groove for receiving an oil scraping ring (not shown). Oil scraped off the inner wall of the cylinder 61a is guided into the recess 51 in the skirt portion 7. A number of downwardly inclined spaced apart passages 45 are provided in the skirt 7 and communicate with the small diameter recess 51. The inclined passages 45 also communicate with an annular groove 46 formed in the outer wall of the retaining tube 9 and with a number of spaced apart passages 47 extending through the retaining tube 9. Accordingly, oil scraped off the inner wall of the cylinder 61a flows into the recess 51 and down into the crank case or the crank chamber via the inclined passages 45, the annular groove 46 and the passages 47.

Figure 8:
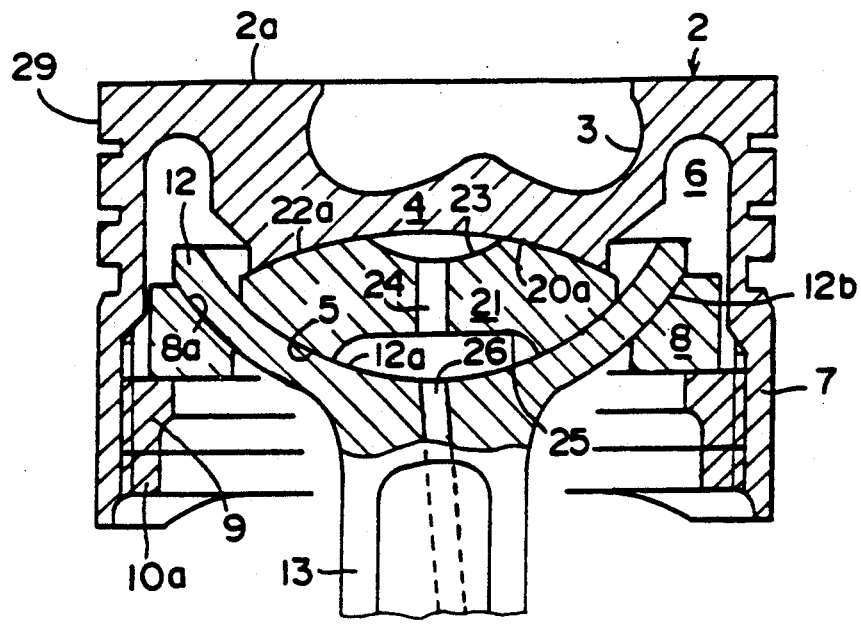
FIGS. 8-12 are front sectional views of piston and connecting rod assemblies according to other partially modified embodiments of the invention.

In an embodiment shown in FIG. 8, a spherically concave base surface 20a on the piston member 4 engages a spherically convex slide surface 22a on the slide member 21. When a lateral load acts on the piston 2 as the connecting rod 13 oscillates, the orientation of the slide member 21 changes at the interface, between the slide surface 22a and the base surface 20a and at the interface between a spherically concave rod surface 12a and a spherically convex piston surface 5 on the slide member 21. In addition, a relative sliding movement occurs between the retaining tube 9 and the retainer member 8. Thus, vibration of the piston 2 is suppressed, and the outer wall of the piston 2 comes into contact with the inner wall of the cylinder 61a uniformly. Since the lateral load of the piston 2 acts uniformly on the inner wall of the cylinder 61a, surface pressure is low, and noises caused by a collision are reduced.

Figure 9:
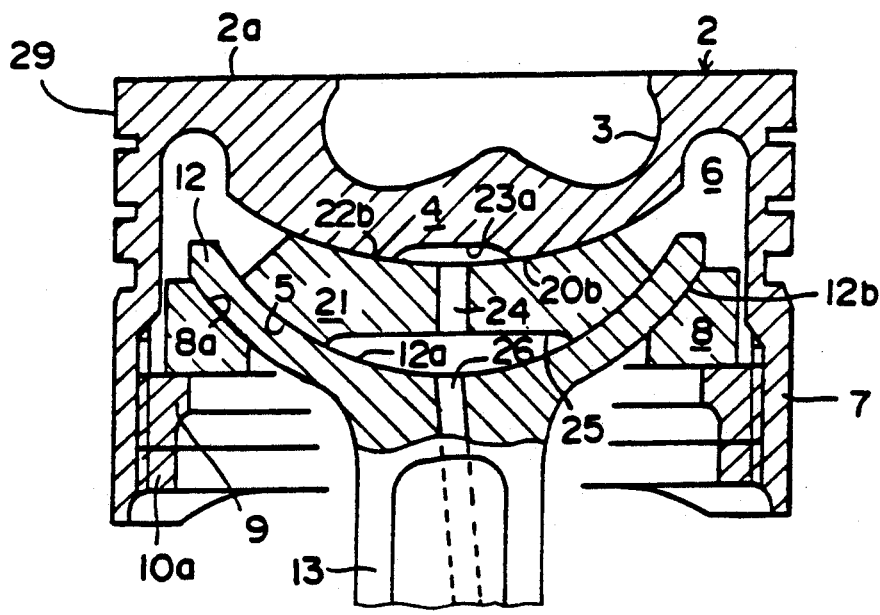

An embodiment shown in FIG. 9 is different from the embodiment shown in FIG. 8 only in that the bottom of the piston member 4 has a spherically convex base surface 20b and an upper end of a slide member 21 has a spherically concave slide surface 22b. Operation and function of the embodiment of FIG. 9 are similar to those of the embodiment of FIG. 8.

Figure 10:
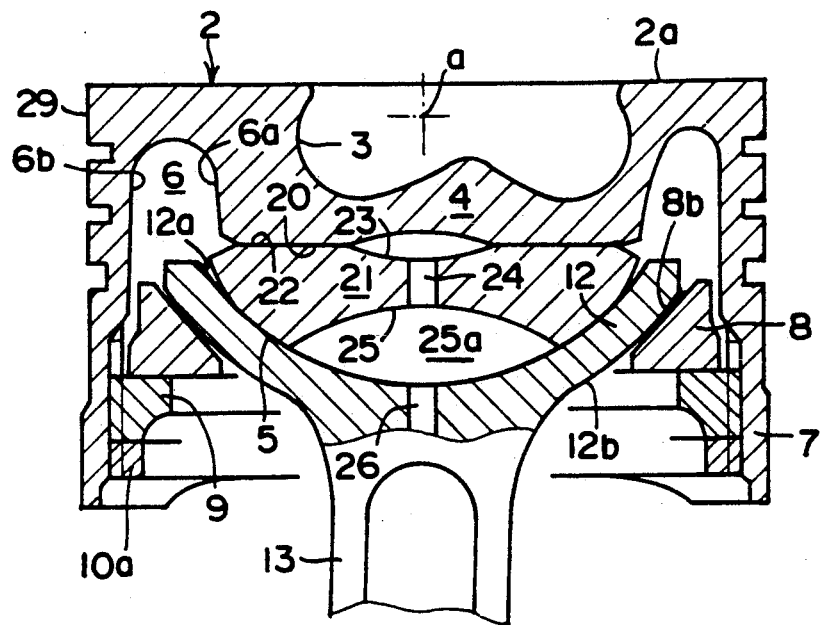

In an embodiment shown in FIG. 10, the center of curvature of a convex piston surface 5 is located above the sliding member 21, and the radius of curvature thereof is smaller than that of a concave rod surface 12a on the rod end 12. Also, the convex piston surface 5 and the concave rod surface 12a have different centers of curvature. A spherically convex support 12b has a common center of curvature with the concave rod surface 12a and is slidably supported on a convex retainer surface 8b on the annular retainer ring 8. The center of curvature of the convex retainer surface 8b is located at a position below and diametrically outside the retainer ring 8. Preferably, the center of curvature of the convex retainer surface 8b lies on an extension of a straight line connecting the oscillating center a of the rod 13 with the center of curvature of the convex piston surface 5. The concave rod surface 12a and the convex support surface 12b are spherical, and the slide member 21 and the retainer ring 8 are constituted as a body of revolution with respect to the center axis of the piston 2.

When the connecting rod 13 oscillates as the piston 2 reciprocates, the concave rod surface 12a and the convex surface 12b slidably engage along a linear contact with respect to the convex piston surface 5 on the slide member 21 and the convex retainer surface 8c on the retainer ring 8. The interface between the rod end 12 and the slide member 21 is lubricated by oil from the annular cavity 6 and from an internal passage 26. Also, the interface between the rod end 12 and the retainer member 8 is lubricated by oil from the annular cavity 6. Because of the above geometry, the area of engagement between the rod end 12 and the slide member 21 and between the retainer member 8 and the rod end 12 is small. Thus, when the members slidably move, an oil film is easily forced therebetween due to a squeezing effect and the load capacity of the oil film is enhanced.

Figure 11:
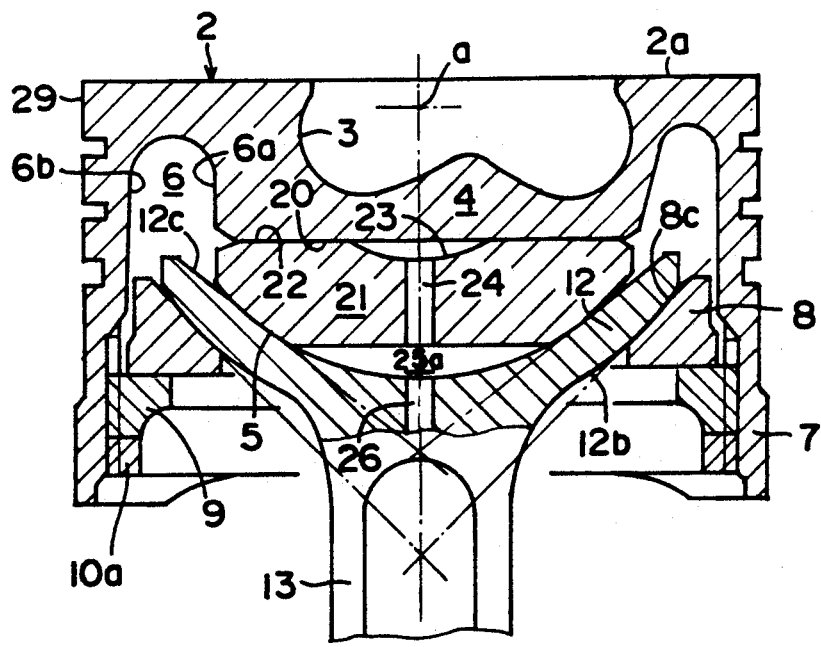

In an embodiment shown in FIG. 11, a spherically convex piston surface 5 formed on the slide member 21 is slidably engaged with a conically concave rod surface 12c formed at the end 12 of the connecting rod 13. A spherically convex support surface 12b formed at a lower portion of the rod end 12 is slidably engaged on a conically concave retainer surface 8c on the upper portion of the annular retainer ring 8.

Figure 12:
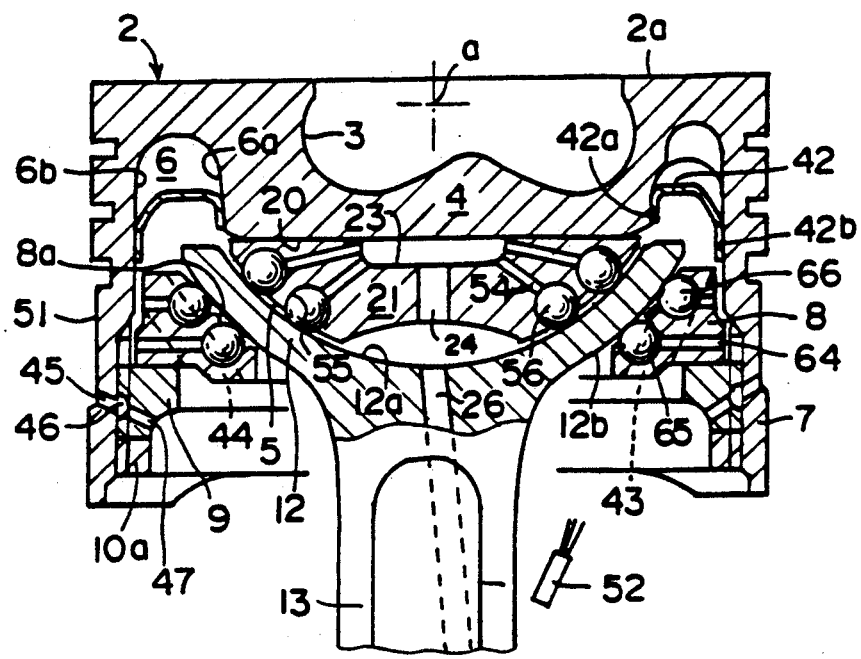

In an embodiment shown in FIG. 12, ball bearings are disposed in the slide member 21 in order to smooth sliding engagement between the slide member 21 and the rod end 12. That is, the convex piston surface 5 on the slide member 21 is provided with a number of spherical spaces 55, each retaining a ball 56 that rolls in contact with the concave rod surface 12a on the rod end 12. A passage 54 extends from a depression 23 in the slide member 21 to each space 55 to provide paths for lubrication.

The concave retainer surface 8a on the retainer ring 8 also is provided with a number of holes 65 each retaining a ball 66 that rolls in contact with the convex support surface 12b on the rod end 12. A passage 64 extends from the cavity 6 surface to each hole 65 to provide paths for lubrication.

The present invention provides the following advantages. The center of oscillation of the connecting rod 13 is displaced toward the crown surface 2a of the piston 2 as compared with the conventional pin connection construction. Thus, if the arm of the crank shaft and the connecting rod 13 are lengthened by that displacement distance, the stroke of the piston 2 is increased without changing the height of the cylinder body 61a or increasing the maximum angle of inclination of the connecting rod 13. Since the height of the cylinder body 61a remains unchanged, there is no increase in cost with respect to construction thereof. The displacement is increased due to the increase in the stroke of the piston, a proportion of the piston occupied by a wasteful volume at T.D.C. is decreased, and removal of exhaust gases is simplified. Also, even if the stroke of the piston is increased, the maximum angle of inclination of the connecting rod is not increased, and problems such as piston slap, frictional loss resulting therefrom, abrasion of piston rings, noises of slap and the like can be avoided. Since the inertia mass of the piston is small, a reduction in slap sound, an increase in durability and service life of piston rings and cylinder liner and a reduction in frictional loss and enhancement of fuel cost is obtained. Furthermore, surface pressure with respect to an explosion load at the end 12 of the connecting rod 13 is low to establish these advantages in terms of high supercharging in an internal combustion engine. Since the center of oscillation of the piston 2 is near the crown surface 2a subjected to the explosion load, the shock resulting from oscillation of the piston is relieved to thereby reduce operating noises.

Obviously, many modifications and variations of the present invention are possible in light of the above teachings. It is to be understood, therefore, that the invention can be practiced otherwise than as specifically described.

What is claimed is:

1. Internal combustion engine apparatus comprising:
   a piston means having one end defining a crown surface and another end defining an annular piston engagement surface;
   connecting rod means having an elongated middle portion, one end adapted for connection to a crank shaft and an opposite end defining an annular rod engagement surface slidably engaged with said piston engagement surface along an annular junction; said rod engagement surface and said piston engagement surface being shaped and arranged to provide for said connecting rod means a center of oscillation substantially displaced from said engaged surfaces in a direction toward said crown surface;
   a chamber formed between said piston means and said opposite end of said rod means; said chamber disposed within said annular junction, intersecting said annular junction, and extending transversely to the axis of said elongated middle portion of said rod means so as to substantially reduce the width of said annular junction;
   passage means providing an oil flow path to said chamber; and
   retainer means coupled between said piston means and said connecting rod means and adapted to maintain said piston engagement surface engaged with said rod engagement surface.

2. An apparatus according to claim 1 wherein said opposite end further defines a convex support surface, and said retainer means defines a concave retainer surface engaged with said support surface.

3. An apparatus according to claim 2 wherein said piston means comprises a central body portion defining said piston engagement surface, and a skirt portion projecting from said crown surface and spaced from said body portion so as to form therewith an annular cavity intersecting said annular junction.

4. An apparatus according to claim 3 wherein an outer surface of said skirt portion defines an annular recess, said skirt portion defines a plurality of orifices communicating with said recess, and said retainer means defines a plurality of openings communicating with said orifices.

5. An apparatus according to claim 3 wherein said retainer means comprises annular means surrounding said rod means and fixed to said skirt portion.

6. An apparatus according to claim 5 wherein said passage means further provides an oil flow path to said annular cavity.

7. An apparatus according to claim 6 wherein said middle portion and said opposite end are detachably secured.

8. An apparatus according to claim 5 wherein said retainer means comprises a ring defining said retainer surface and a threaded nut engaging said skirt portion and maintaining engagement between said retainer surface and said support surface.

9. An apparatus according to claim 2 wherein said piston means comprises a piston member defining at opposing ends said crown surface and a base surface, and a slide member defining said piston engagement surface and a slide surface slidably engaged with said base surface; and said slide member is adapted to accommodate relative transverse motion between said connecting rod means and said piston member.

10. An apparatus according to claim 9 wherein said slide member and said opposite end define said chamber.

11. An apparatus according to claim 10 wherein said base surface and said slide surface are substantially planar, said rod engagement surface is concave and said piston engagement surface is convex.

12. An apparatus according to claim 11 wherein all of said concave and convex surfaces are spherical.

13. An apparatus according to claim 10 wherein said base surface and said rod engagement surface are concave, and said piston engagement surface and said slide surface are convex.

14. An apparatus according to claim 13 wherein all of said concave and convex surfaces are spherical.

15. An apparatus according to claim 10 wherein said piston engagement surface and said base surface are convex, and said rod engagement surface and said slide surface are concave.

16. An apparatus according to claim 15 wherein all of said concave and convex surfaces are spherical.

17. An apparatus according to claim 10 wherein said piston engagement surface and said rod engagement surface are shaped to produce annular, substantially linear engagement therebetween.

18. An apparatus according to claim 17 wherein said piston engagement surface and said rod engagement surface are spherical with different centers.

19. An apparatus according to claim 17 wherein one of said piston engagement surface and said rod engagement surface is spherical and the other is conical.

20. An apparatus according to claim 10 wherein said body portion and said slide member define an auxiliary chamber, and said passage means further provides an oil flow path to said auxiliary chamber.

21. An apparatus according to claim 9 wherein said piston means comprises a central body portion defining said piston engagement surface, and a skirt portion projecting from said crown surface and spaced from said body portion so as to form therewith an annular cavity intersecting said annular junction.

22. An apparatus according to claim 21 wherein said retainer means comprises annular means surrounding said rod means and fixed to said skirt portion.

23. An apparatus according to claim 21 including an annular insert retained between said body portion and said skirt portion, said insert dividing said annular cavity into two annular portions and defining oil inlet and oil outlet openings.

24. An apparatus according to claim 9 including ball bearing means disposed between at least one of said support and retainer surfaces and said rod and piston engagement surfaces.

* * * * *